United States Patent
Iwai et al.

(10) Patent No.: US 12,253,906 B2
(45) Date of Patent: Mar. 18, 2025

(54) INFORMATION PROCESSING DEVICE, INFORMATION PROCESSING METHOD, AND NON-TRANSITORY COMPUTER-READABLE STORAGE MEDIUM STORING PROGRAM

(71) Applicant: Panasonic Intellectual Property Management Co., Ltd., Osaka (JP)

(72) Inventors: Mitsutaka Iwai, Kanagawa (JP); Masamitsu Murase, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 22 days.

(21) Appl. No.: 18/373,011

(22) Filed: Sep. 26, 2023

(65) Prior Publication Data

US 2024/0126635 A1    Apr. 18, 2024

(30) Foreign Application Priority Data

Oct. 13, 2022 (JP) .................. 2022-164743

(51) Int. Cl.
*G06F 11/07* (2006.01)

(52) U.S. Cl.
CPC ........ *G06F 11/079* (2013.01); *G06F 11/0709* (2013.01)

(58) Field of Classification Search
CPC ............. G06F 11/079; G06F 11/0709
See application file for complete search history.

(56) References Cited

U.S. PATENT DOCUMENTS

| | | | |
|---|---|---|---|
| 9,215,292 B2 * | 12/2015 | Fujii | ............. H04L 67/60 |
| 2009/0265027 A1 | 10/2009 | Takahashi et al. | |
| 2022/0107802 A1 * | 4/2022 | Rao | ............. G06F 16/907 |
| 2022/0383650 A1 * | 12/2022 | Lewis | ............. G06V 30/222 |

FOREIGN PATENT DOCUMENTS

| | | |
|---|---|---|
| JP | 8-77042 | 3/1996 |
| JP | 10-240705 | 9/1998 |
| JP | 11-203113 | 7/1999 |
| JP | 2008-59413 | 3/2008 |
| JP | 4780715 | 9/2011 |

* cited by examiner

*Primary Examiner* — Jigar P Patel
(74) *Attorney, Agent, or Firm* — Wenderoth, Lind & Ponack, L.L.P.

(57) ABSTRACT

A processor of an information processing device acquires first device information including failure information related to each client terminal, and failure resolution information, and generates a failure database containing the failure information and the failure resolution information associated with each other. The processor acquires second device information related to each client terminal at a predetermined time interval, and performs, in the failure database, primary search for the failure resolution information based on information for search for searching for the failure resolution information. The processor performs, in the second device information, secondary search for the information of the client terminal specified by the information for search, extracts specific information of the specified client terminal from the failure resolution information by extracting information corresponding to a result of the secondary search from a result of the primary search, and transmits the specific information to the specified client terminal by the output unit.

4 Claims, 7 Drawing Sheets

INFORMATION PROCESSING DEVICE, INFORMATION PROCESSING METHOD, AND NON-TRANSITORY COMPUTER-READABLE STORAGE MEDIUM STORING PROGRAM

BACKGROUND

1. Technical Field

The present disclosure relates to an information processing device, an information processing method, and a non-transitory computer-readable storage medium storing a program.

2. Description of the Related Art

Unexamined Japanese Patent Publication No. H10-240705 discloses an integrated failure management device that integrally manages failures occurring in a plurality of information communication processing devices connected via a network. In the integrated failure management device, countermeasures against failures occurring in the information communication processing devices are accumulated as know-how in an integrated manner.

SUMMARY

However, the integrated failure management device described in Unexamined Japanese Patent Publication No. H10-240705 has a problem in that the amount of accumulated data is enormous, and it is difficult to obtain an appropriate countermeasure for a target terminal.

An object of the present disclosure is to provide an information processing device, an information processing method, and a non-transitory computer-readable storage medium storing a program that facilitate acquisition of more appropriate failure resolution information for a client terminal.

One aspect of the present disclosure provides an information processing device used in a failure information provision system including a client system, the client system including a plurality of client terminals, the information processing device comprising: a processor; an input unit; and an output unit, in which the processor is configured to acquire first device information provided by a provider of each of the client terminals, the first device information including failure information indicating a failure related to each of the client terminals and failure resolution information for resolving the failure, generate a failure database containing the failure information and the failure resolution information that are associated with each other, acquire, from the client system, at a predetermined time interval, second device information of each of the client terminals managed in the client system, perform, in the failure database, primary search for the failure resolution information based on information for search for searching for the failure resolution information, the information for search being input via the input unit, perform, in the second device information, secondary search for information of the client terminal specified by the information for search, extract specific information of the client terminal that has been specified, from the failure resolution information by extracting information corresponding to a result of the secondary search from a result of the primary search, and transmit, by the output unit, the specific information to the client terminal that has been specified.

One aspect of the present disclosure provides an information processing method executed by an information processing device used in a failure information provision system including a client system, the client system including a plurality of client terminals, the information processing device including a processor, an input unit, and an output unit, the information processing method including, by the processor: acquiring first device information provided by a provider of each of the client terminals, the first device information including failure information indicating a failure related to each of the client terminals and failure resolution information for resolving the failure; generating a failure database containing the failure information and the failure resolution information that are associated with each other; acquiring, from the client system, at a predetermined time interval, second device information of each of the client terminals managed in the client system; performing, in the failure database, primary search for the failure resolution information based on information for search for searching for the failure resolution information, the information for search being input via the input unit; performing, in the second device information, secondary search for information of the client terminal specified by the information for search; extracting specific information of the client terminal that has been specified, from the failure resolution information by extracting information corresponding to a result of the secondary search from a result of the primary search; and transmitting, by the output unit, the specific information to the client terminal that has been specified.

One aspect of the present disclosure provides a non-transitory computer-readable storage medium storing a program for causing an information processing device to execute the information processing method described above.

According to the present disclosure, it is possible to provide an information processing device, an information processing method, and a non-transitory computer-readable storage medium storing a program that facilitate acquisition of more appropriate failure resolution information for a client terminal.

DETAILED DESCRIPTIONS

Background to Present Disclosure

A technique for accumulating failure resolution information for a failure occurring in a terminal connected via a network is known. In the conventional technique, there is a problem in that the amount of accumulated data is enormous, and it is difficult to obtain an appropriate countermeasure for the target terminal.

In addition, there is known a conventional technique in which an update program can be found by an input of a name or content of the update program in a search input form. In the description field of the found update program, a failure content that has occurred in the program of a past version may be described. However, in the conventional technique, there is a problem in that an update program cannot be searched for from failure contents.

Further, there is known a conventional technique in which an update program is distributed regardless of a failure situation on a terminal side. In such a conventional technique, a program normally operating in a terminal may be overwritten with an update program unnecessary for the terminal, or an unnecessary additional program may be installed. As a result, even though the terminal has normally operated by the program before the update, a failure may occur in the operation of the terminal by the update program or the additional program. As described above, in the conventional technique, there is a problem in that a side effect due to installation of an update program or an additional program occurs.

In order to solve such problems, the inventor has completed a technique that enables a client terminal to acquire more appropriate failure resolution information.

1. Exemplary Embodiment

An exemplary embodiment of the present disclosure will now be described herein with reference to the drawings appropriately. In each of the drawings, elements may be exaggerated as appropriate in order to facilitate explanation. Note that the present disclosure is not limited to the following exemplary embodiment. Furthermore, the present disclosure can be modified as appropriate without departing from the scope within which an effect of the present disclosure is exhibited.

1-1. Configuration Example of System and Device

Figure 1:
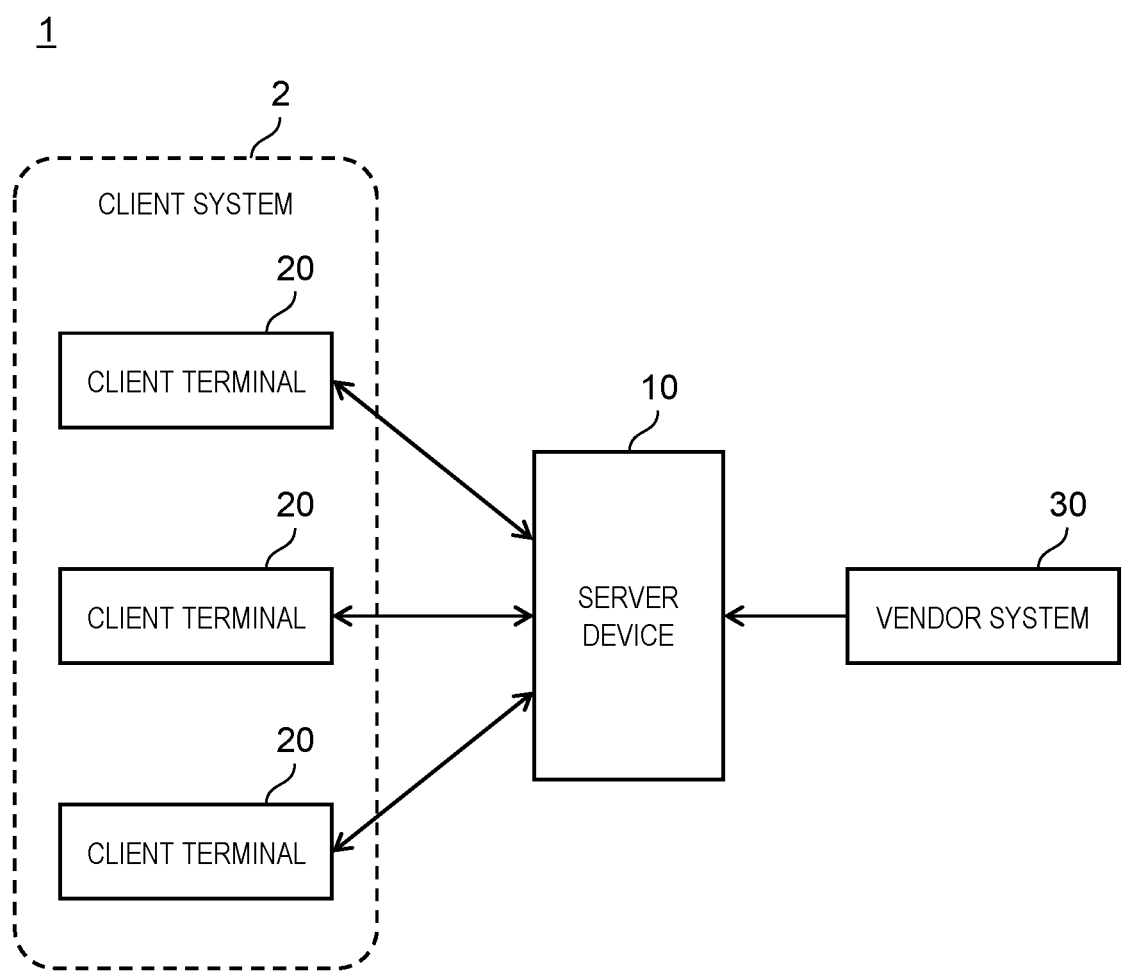
FIG. 1 is a block diagram illustrating a configuration example of a failure information provision system according to an exemplary embodiment.

FIG. 1 is a block diagram illustrating a configuration example of failure information provision system 1 according to an exemplary embodiment of the present disclosure. Failure information provision system 1 includes client system 2, server device 10, and vendor system 30.

Client system 2 includes a plurality of client terminals 20. FIG. 1 illustrates three client terminals 20, but the number of client terminals 20 included in client system 2 is not limited thereto. Each of client terminals 20 and vendor system 30 are communicably connected to server device 10 via, for example, a network.

Vendor system 30 is a system managed by a vendor of an information processing device. The vendor is an example of a developer or a provider of the information processing device. Client terminals 20 are a part or all of such an information processing device. For example, the vendor may include a hardware vendor such as an independent hardware vendor (IHV) and a software vendor such as an independent software Vendor (ISV). The number of vendor systems 30 is not limited to one, and may be two or more. For example, server device 10 may be communicably connected to a vendor system operated by each of a plurality of vendors.

Vendor system 30 accumulates information such as failure information indicating a failure related to the information processing device provided by the vendor and failure resolution information for solving the failure (hereinafter, it may be referred to as "first device information" or "general device information"), and transmits the accumulated information to server device 10. The general device information may include failure information indicating a failure related to hardware of an information processing device developed by a vendor or software that can be installed in such hardware, failure resolution information for resolving the failure, update information of the software, and the like. The information processing device developed by the vendor can constitute client terminal 20.

As used herein, "failure" includes any error, breakdown, or defect in the device or in any component of the device, such as hardware or software. Alternatively, or in addition thereto, "failure" includes inability of the above component to exert original functions.

Client system 2 is, for example, a system managed by an entity that uses client terminal 20, such as a company or an organization. Client system 2 collects information of the plurality of client terminals 20 and transmits the collected information to server device 10. Such information includes, for example, information on the information processing device constituting client terminal 20 (hereinafter, it may be referred to as "second device information" or "client terminal information"). The client terminal information may include failure information indicating a failure related to hardware of the information processing device constituting client terminal 20 or software that can be installed in such hardware, failure resolution information for resolving the failure, update information of the software, and the like.

Figure 2:
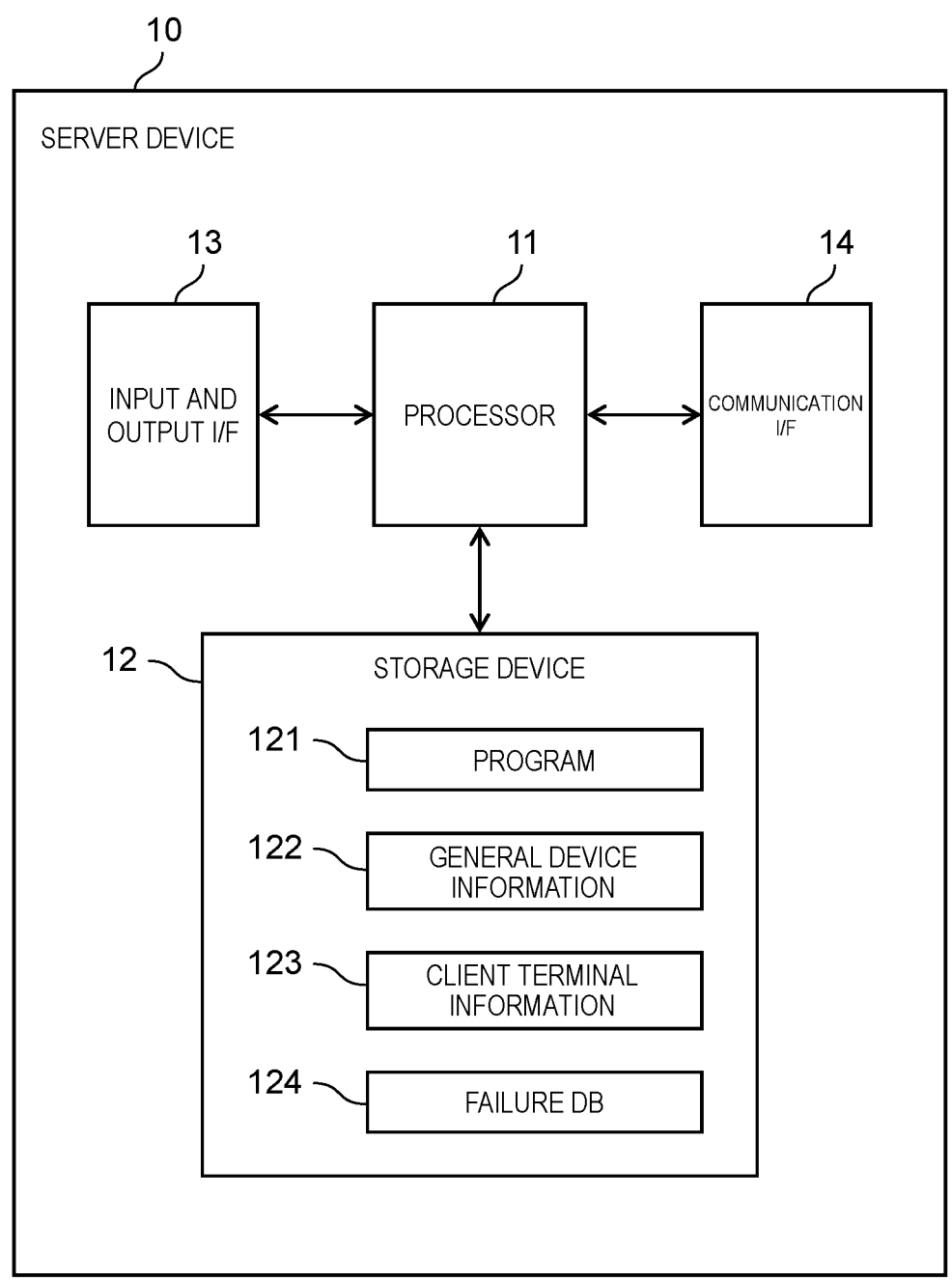
FIG. 2 is a block diagram illustrating a configuration example of a server device according to the exemplary embodiment.

FIG. 2 is a block diagram illustrating a configuration example of server device 10 of FIG. 1. Server device 10 includes processor 11, storage device 12, input and output interface (I/F) 13, and communication interface 14.

Processor 11 executes information processing to implement the function of server device 10. Such information processing is implemented, for example, by processor 11 operating in accordance with a command of program 121 stored in storage device 12. Processor 11 includes, for example, a circuit such as a central processing unit (CPU), a microprocessor unit (MPU), or a field programmable gate array (FPGA). Processor 11 may be implemented by such a circuit alone, or may be implemented by a plurality of circuits.

Storage device 12 stores various data including program 121 necessary for implementing the function of server device 10, general device information 122 to be described later, client terminal information 123, and failure database 124. Storage device 12 is implemented by, for example, a semiconductor storage device such as a flash memory or a solid state drive (SSD), a magnetic storage device such as a hard disk drive (HDD), or other storage media alone or in combination thereof. Storage device 12 may include a transitory storage device such as static random-access memory (SRAM) or dynamic random-access memory (DRAM).

Input and output interface 13 is an interface circuit that connects server device 10 and an external device in order to receive information from the external device or output information to the external device. Input and output interface 13 may be a communication circuit that performs data communication according to an existing wired communication standard or wireless communication standard. Input and output interface 13 is an example of an "input unit" and an "output unit" of the present disclosure.

Communication interface 14 is a communication circuit that performs data communication according to an existing wired communication standard or wireless communication standard. Processor 11 can perform data communication with each client terminal 20 and vendor system 30 via communication interface 14 and the network. Communication interface 14 is an example of an "input unit" and an "output unit" of the present disclosure.

Figure 3:
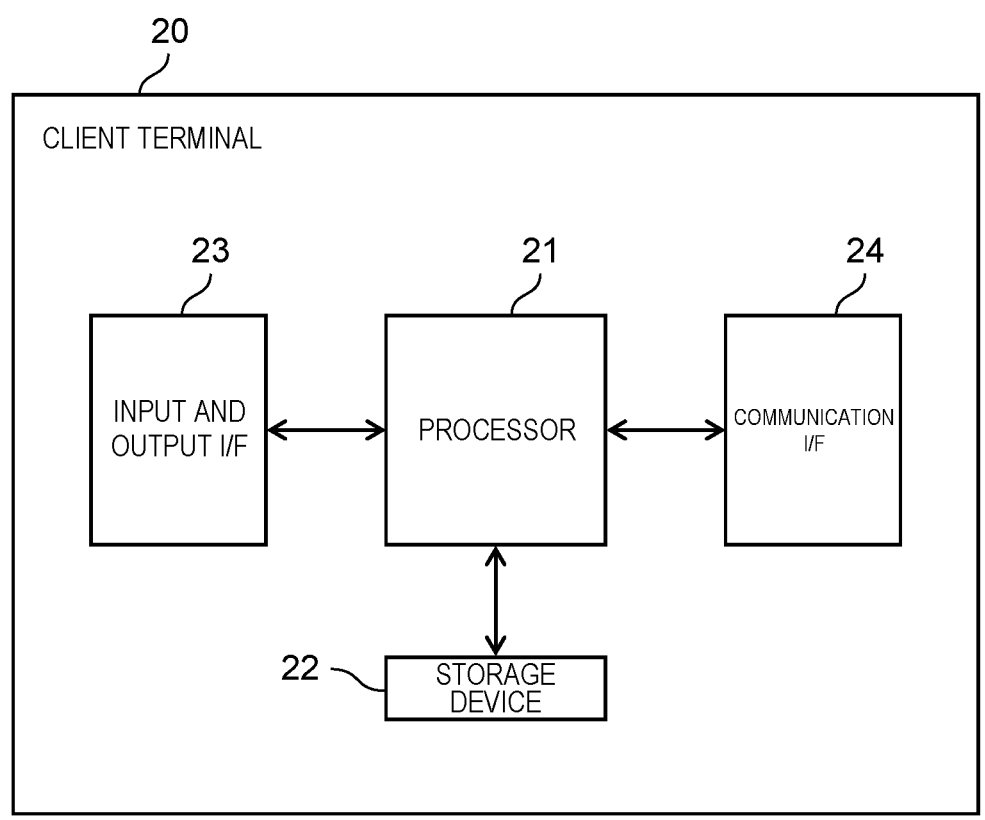
FIG. 3 is a block diagram illustrating a configuration example of a client terminal in FIG. 1.

FIG. 3 is a block diagram illustrating a configuration example of client terminal 20 in FIG. 1. Client terminal 20 includes processor 21, storage device 22, input and output interface 23, and communication interface 24.

Processor 21 executes information processing to implement the function of client terminal 20. Such information processing is implemented, for example, by processor 21 operating in accordance with a command of a program stored in storage device 22. Processor 21 includes, for example, a circuit such as a CPU, an MPU, or an FPGA. Processor 21 may be implemented by such a circuit alone, or may be implemented by a plurality of circuits.

Storage device 22 stores various data including a program necessary for implementing the function of client terminal 20. Storage device 22 is an example of a non-transitory computer-readable storage medium in which a program is stored. Storage device 22 is implemented by, for example, a semiconductor storage device such as a flash memory or an SSD, a magnetic storage device such as an HDD, or other storage media alone or in combination thereof. Storage device 22 may include a transitory storage device such as SRAM or DRAM.

Input and output interface 23 is an interface circuit that connects client terminal 20 and an external device in order to receive information from the external device or output information to the external device. Input and output interface 23 may be a communication circuit that performs data communication according to an existing wired communication standard or wireless communication standard.

Communication interface 24 is a communication circuit that performs data communication according to an existing wired communication standard or wireless communication standard. Processor 21 can perform data communication with server device 10 via communication interface 24 and the network.

1-2. Data Configuration Example

Figure 4:
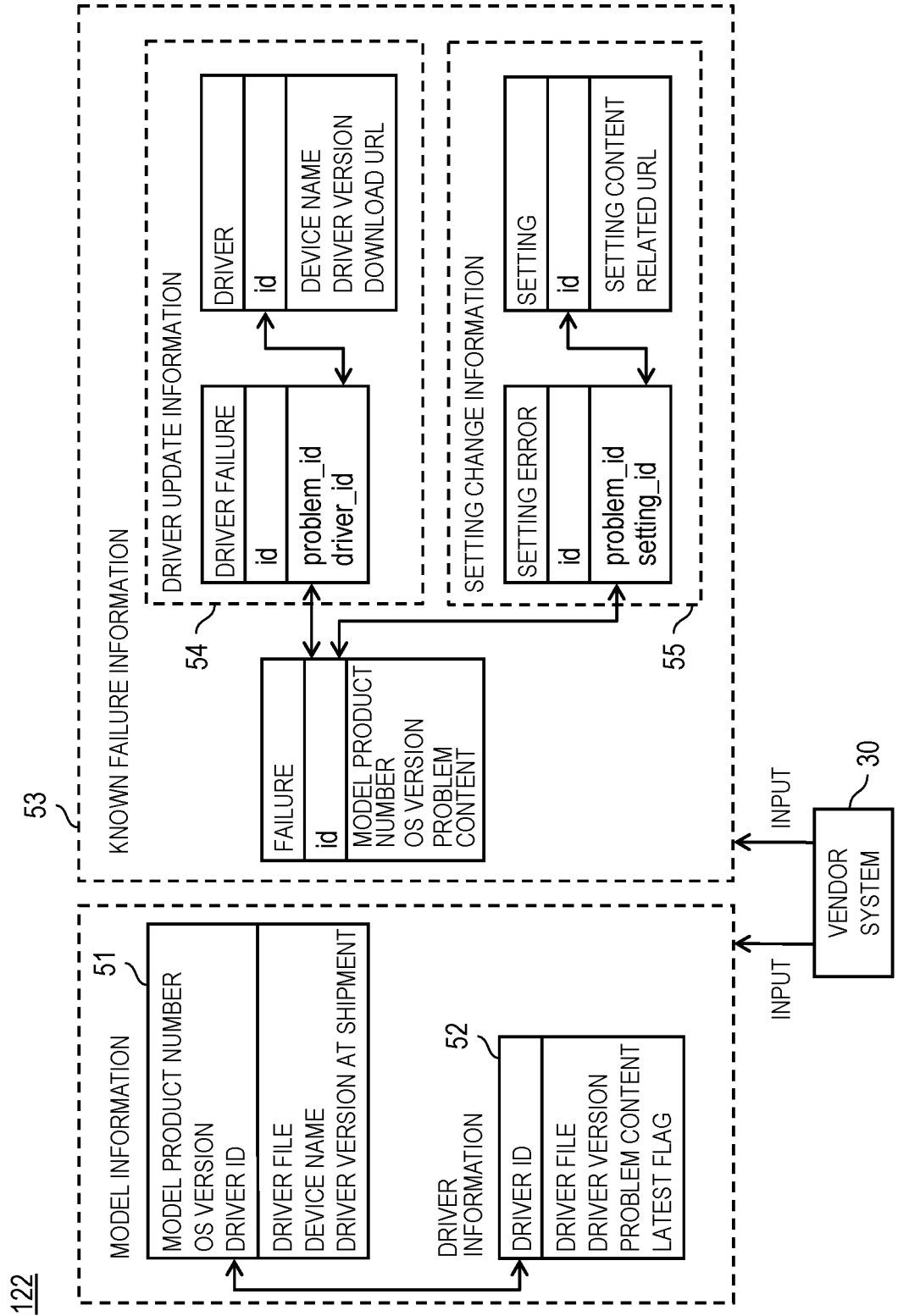
FIG. 4 is a schematic diagram illustrating a data configuration example of general device information stored in a storage device of the server device according to the exemplary embodiment.

FIG. 4 is a schematic diagram illustrating a data configuration example of general device information 122 stored in storage device 12. General device information 122 is information on an information processing device provided by a vendor, and is input from, for example, vendor system 30.

General device information 122 includes model information 51 and driver information 52 of the information processing device. Model information 51 is information on hardware or software of the information processing device. For example, model information 51 includes information such as a model product number of the information processing device, a version of a mounted operating system (OS), an identifier (ID) of a driver installed in the information processing device, a driver file, a device name, and a version of the driver at the time of shipment.

Driver information 52 includes information such as an ID, a file, a version, a problem content, and a latest flag of the driver. The problem content of the driver is, for example, failure information of the driver. The latest flag is a flag indicating whether the driver is the latest version.

Model information 51 and driver information 52 are associated with each other by the ID of the driver. General device information 122 may further include information of the information processing device related to software or an application other than the driver.

General device information 122 further includes known failure information 53 collected by the vendor. An identifier (id) is assigned to each failure, and each failure is specified by, for example, the model product number of the information processing device in which the failure has occurred, the version of the installed OS, and the problem content. Failure information 53 includes, for example, driver update information 54 and setting change information 55 for resolving the failure. Driver update information 54 and setting change information 55 are examples of the failure resolution information of the present disclosure.

Driver update information 54 is used when there is a failure in the driver and the failure is resolved by updating the driver. Driver update information 54 includes information about a driver failure. Driver failure information includes id information of the failure, and the id includes a problem content id (problem_id) assigned to each problem content of the failure and an id (driver_id) for specifying the driver.

Driver update information 54 includes update information about driver update. This information may be acquired on the basis of driver information 52 described above. The update information of the driver includes information such as an id of a failure, a device name of an installation destination, a version of the driver, and a source of the driver such as a download URL. The driver failure information and the update information are associated with each other by the id.

Setting change information 55 is used in a case where there is an error in the setting of the information processing device and the failure is resolved when the setting is changed. Setting change information 55 includes information about a setting error. The setting error information includes id information of a failure caused by a setting error, and the id includes a problem content id (problem_id) assigned to each content of the error and a setting id (setting_id) assigned to each setting.

Setting change information 55 includes information about a setting change. The setting change information includes information such as an id of a failure, a setting content after the change, and a source of the setting after the change such as a related URL. The setting error information and the information about the setting change are associated with each other by the id.

Figure 6:
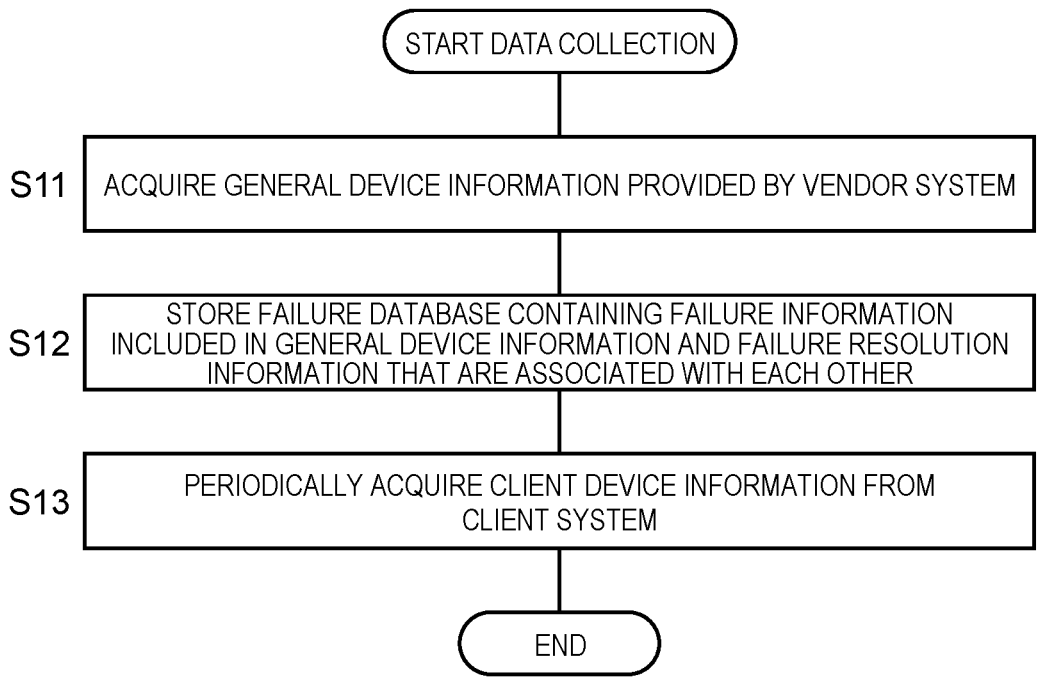
FIG. 6 is a flowchart illustrating a flow of data collection processing by the server device according to the exemplary embodiment.

Processor 11 constructs failure database 124 by associating failure information included in known failure information 53 with failure resolution information for resolving the failure, and stores failure database 124 in storage device 12 (see S12 in FIG. 6). Model information 51 and driver information 52 may also be used to construct failure database 124.

Figure 5:
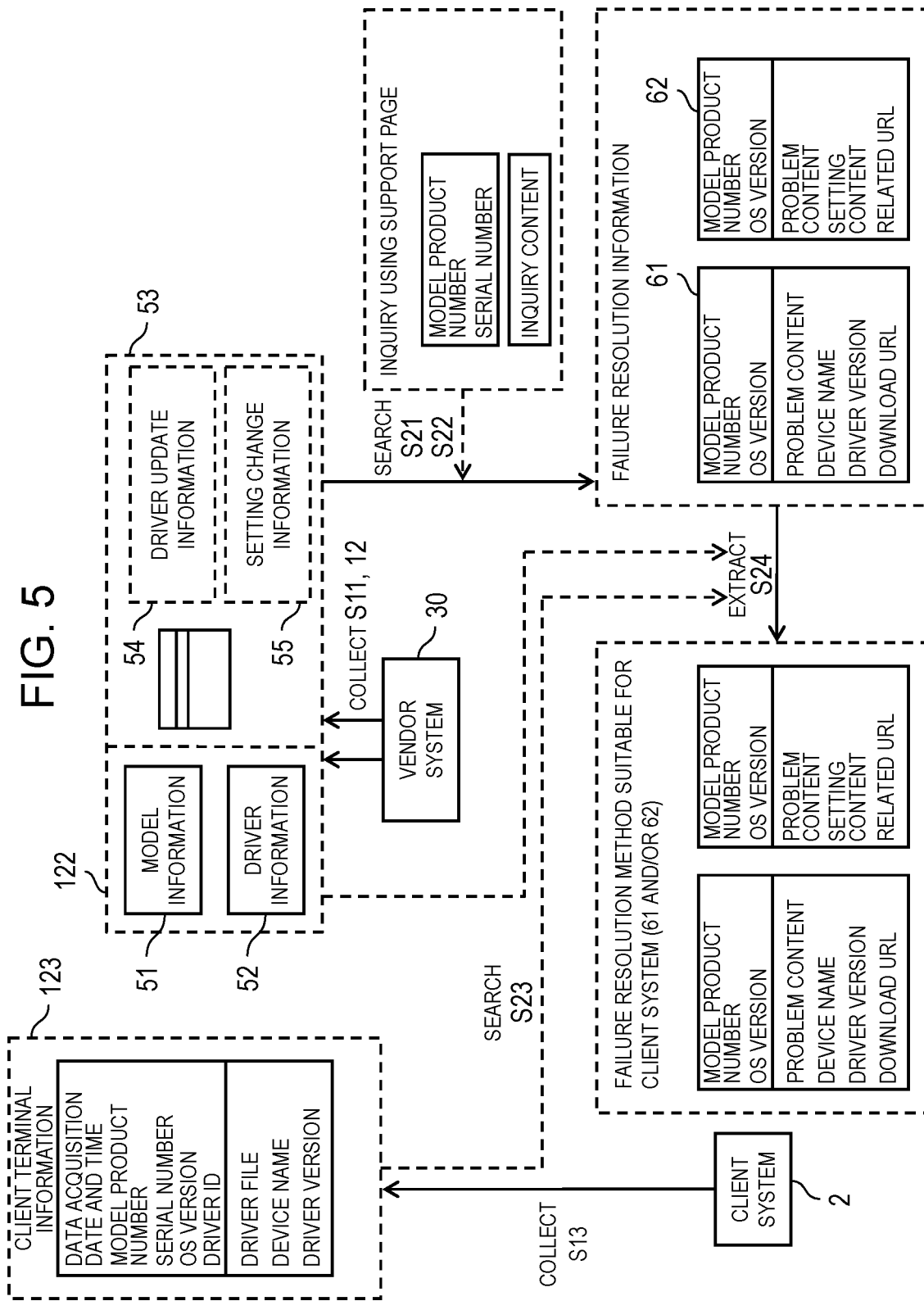
FIG. 5 is a schematic diagram illustrating a flow of data in the failure information provision system according to the exemplary embodiment.

FIG. 5 is a schematic diagram illustrating a flow of data in failure information provision system 1 according to the present exemplary embodiment. Details of each processing illustrated in FIG. 5 will be described later with reference to FIG. 6 and FIG. 7, and an outline of each processing will be described with reference to FIG. 5.

As illustrated in FIG. 4, general device information 122 is input from, for example, vendor system 30 (see S11 in FIG. 6). Processor 11 constructs failure database 124 by associating failure information included in known failure information 53 with failure resolution information for resolving the failure, and stores failure database 124 in storage device 12 (see S12 in FIG. 6).

On the other hand, processor 11 acquires client terminal information 123 from client system 2 (see S13 in FIG. 6). Client terminal information 123 includes, for example, a data acquisition time, and information of a model product number or a serial number of client terminal 20. As used herein, the information of "time" may be information indicating only a time or may include information of both a date and a time.

Client terminal information 123 may include information of the OS, BIOS, hardware, software, setting, and registry of client terminal 20. Further, client terminal information 123 may include information such as an ID, a file, and a version of application software or a driver installed in client terminal 20.

For example, a user inputs information for search including information such as a model product number and a serial number, and a keyword or a query including an inquiry content in an input form of a support page. Such a support page may be managed by server device 10 or may be managed by another information processing device. Processor 11 searches (primary search, see S21 and S22 in FIG. 7) failure database 124 for the failure resolution information corresponding to the input information for search.

When a search is performed using the support page, various failure resolution information 61 and/or 62 on various information processing devices are obtained. Failure resolution information 61 and/or 62 may be failure resolution information for information processing devices having different model product numbers or OS versions, or may be failure resolution information for information processing devices having the same model product number and OS version. Failure resolution information 61 and/or 62 include, for example, a target problem content, a setting content, a device name, a driver version, a URL of a web page from which the failure resolution information can be downloaded, and the like.

Further, processor 11 searches (secondary search, see S23 in FIG. 7) client terminal information 123 for the information of client terminal 20 specified by the information for search that has been input to the input form of the support page, in particular, the information such as the model product number and the serial number.

Figure 7:
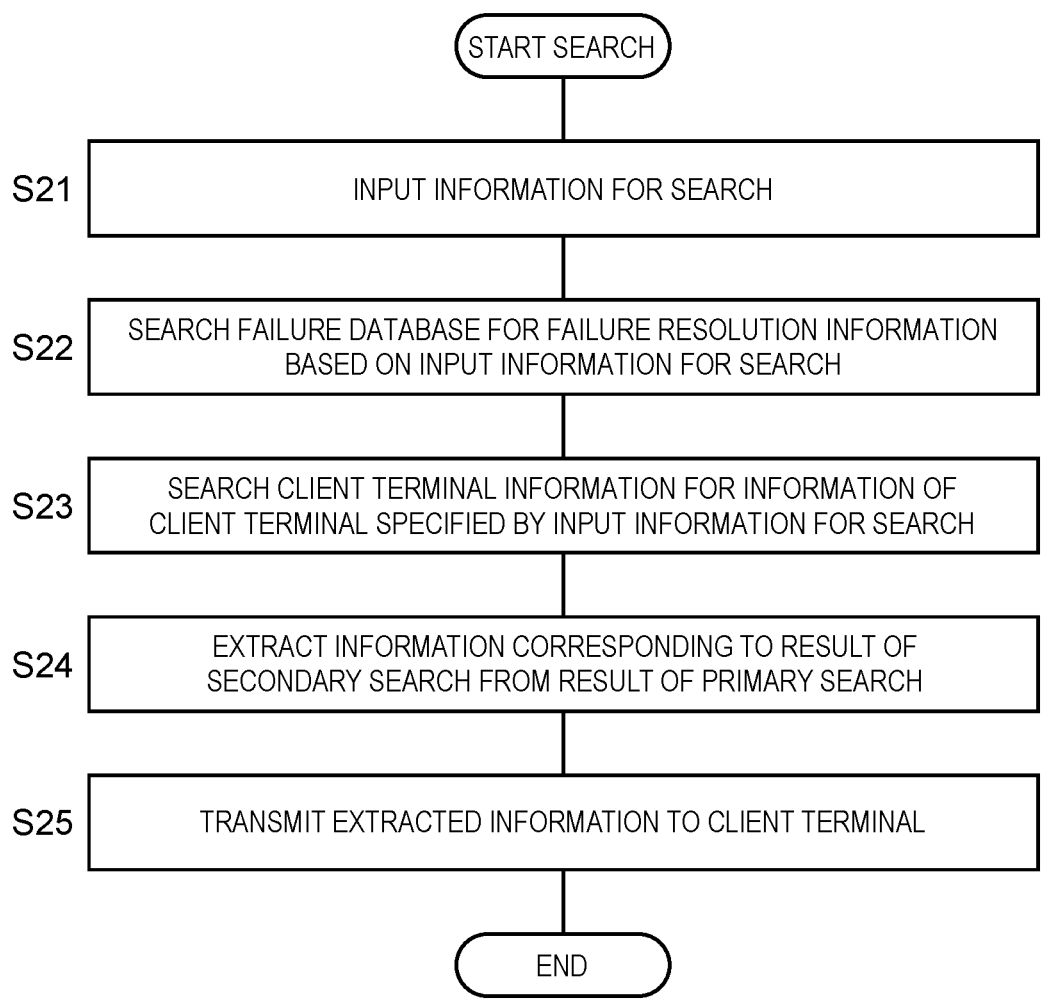
FIG. 7 is a flowchart illustrating a flow of search processing by the server device according to the exemplary embodiment.

Processor 11 extracts information of specified client terminal 20 corresponding to the secondary search from failure resolution information 61 and/or 62 which are results of the primary search (see S24 in FIG. 7).

As a result, failure information provision system 1 can extract a resolution suitable for client system 2. For example, failure information provision system 1 can extract a failure that may occur in application software or a driver mounted on target client terminal 20. In particular, according to failure information provision system 1, even when the data amount of failure database 124 increases over the years, it is possible to appropriately remove a failure or the like occurring in an old driver from the extraction result. Further, since server device 10 stores the information of client terminal 20 together with the information of the acquisition time, it is also possible to display the failure related to the recently (for example, after a time that is predetermined time before the current time) changed application software or driver on client terminal 20 with priority.

1-3. Operation Example

Hereinafter, an operation example of server device 10 will be described with reference to FIG. 6 and FIG. 7. Processor 11 of server device 10 executes data collection processing illustrated in FIG. 6 and search processing illustrated in FIG. 7.

FIG. 6 is a flowchart illustrating a flow of data collection processing by server device 10. First, processor 11 acquires general device information 122 provided by vendor system 30 (S11). Processor 11 stores the acquired general device information 122 in storage device 12.

Next, processor 11 constructs failure database 124, and stores failure database 124 in storage device 12 (S12). Failure database 124 includes data containing failure information included in general device information 122 and failure resolution information for solving the failure that are associated with each other.

Processor 11 acquires client terminal information 123 from client system 2 periodically, for example, every 24 hours or every week (S13). However, step S13 is not limited to periodically acquiring client terminal information 123 by processor 11. For example, processor 11 may acquire client terminal information 123 at a plurality of predetermined times or may acquire client terminal information 123 irregularly. Processor 11 stores the acquired client terminal information 123 in storage device 12 together with the information of the acquisition time.

FIG. 7 is a flowchart illustrating a flow of search processing by server device 10. First, Processor 11 receives an input of information for search via input and output interface 13 or communication interface 14 (S21). The information for search is information for searching for the failure resolution information, and is input to, for example, an input form of the support page. The information for search includes, for example, information such as a model product number and a serial number, and a keyword or a query including an inquiry content.

Next, Processor 11 searches failure database 124 for failure resolution information corresponding to the information for search input in step S21 (primary search) (S22).

Processor 11 searches client terminal information 123 for information of client terminal 20 specified by the information for search input in step S21 (secondary search) (S23). Step S23 may be executed before step S22, unlike the order illustrated in FIG. 7.

Next, processor 11 extracts information of the specified client terminal 20 corresponding to the secondary search from the result of the primary search (S24). As a result, the result of the primary search can be narrowed down using the result of the secondary search.

Processor 11 transmits the information extracted in step S24 to client terminal 20 specified by the information for search via input and output interface 13 or communication interface 14 (S25). The information received by client terminal 20 is notified to the user of client terminal 20 by a notification means such as a display of client terminal 20.

With the above operation, server device 10 can extract a failure that may occur in the application software or the driver mounted on target client terminal 20. For example, even when the data amount of failure database 124 increases over the years, server device 10 can appropriately remove a failure or the like occurring in an old driver from the extraction result by executing extraction processing S24.

Furthermore, server device 10 may store the information of client terminal 20 acquired in step S13 in storage device 12 together with the information of the acquisition time. As a result, server device 10 can preferentially transmit, to client terminal 20, a failure related to the application software or the driver changed after the time that is predetermined time before the current time.

Although some conventional techniques for searching for update information of a software program are known, server device 10 according to the present exemplary embodiment can acquire more appropriate failure resolution information than that of the conventional techniques at least in the following points.

For example, in a case where failure resolution information is searched for, there is known a conventional technique that searches for information only on a program present in a terminal at the time of searching.

In contrast, in one example, server device 10 stores the information of client terminal 20 acquired in step S13 in storage device 12 together with the information of the acquisition time. Therefore, server device 10 can search for the failure resolution information on the basis of the time-series information regarding the program of client terminal 20.

For example, in a case where a failure occurs due to a recently updated driver or a recently changed setting, server device 10 can cause client terminal 20 to display a search result related to application software or a driver that has been changed after a time that is predetermined time before the current time. Such a search result may be displayed in order of the time when the information about the failure is updated, or may be displayed in a ranking format of importance. In the case of considering the importance, server device 10 may set the importance of new failure resolution information higher than the importance of old failure resolution information.

Furthermore, for example, in a conventional technique, an update program can be found by inputting a name or content of the update program in a search input form. In the description field of the found update program, a failure content that has occurred in the program of a past version may be described. However, in the conventional technique, it is not possible to search for the update program from the failure content.

In contrast, server device 10 can search for the information of the update program for client terminal 20 that can resolve the failure when the information for search for searching for the failure resolution information, for example, the content of the failure is input to the input form. Therefore, server device 10 can appropriately search for the failure resolution information for the specific failure of client terminal 20.

Further, for example, there is known a conventional technique in which an update program is distributed regardless of a failure situation on a terminal side. In such a conventional technique, a program normally operating in a terminal may be overwritten with an update program unnecessary for the terminal, or an unnecessary additional program may be installed. As a result, even though the terminal has normally operated by the program before the update, a failure may occur in the operation of the terminal by the update program or the additional program. As described above, in the conventional technique, a side effect due to installation of an update program or an additional program may occur.

In contrast, server device 10 can extract an effective update program corresponding to the failure of client terminal 20 by step S24 of extracting the information of the specified client terminal 20. As a result, server device 10 can provide more appropriate failure resolution information for client terminal 20 while preventing the above-described side effects from occurring.

1-4. Summary

As described above, server device 10 which is an example of the information processing device is used in failure information provision system 1 including client system 2. Client system 2 includes the plurality of client terminals 20. Server device 10 includes processor 11, input and output interface 13, and communication interface 14. Each of input and output interface 13 and communication interface 14 is an example of an input unit and an output unit. Processor 11 acquires general device information (first device information) 122 including the failure information indicating the failure related to each client terminal 20 and the failure resolution information for resolving the failure, provided by the provider of each client terminal 20 (S11). Processor 11 generates failure database 124 containing the failure information and the failure resolution information that are associated with each other (S12). Processor 11 acquires client terminal information (second device information) 123 on each client terminal 20 managed in client system 2 from client system 2 at a predetermined time interval (S13). Processor 11 performs primary search in the failure database to search for the failure resolution information on the basis of the information for search for searching for the failure resolution information (S22). The information for search is input via the input unit (S21). Processor 11 performs secondary search in client terminal information 123 to search for information of client terminal 20 specified by the information for search (S23). Processor 11 extracts information corresponding to the result of the secondary search from the result of the primary search, thereby extracting specific information on the specified client terminal 20 from the failure resolution information (S24). Processor 11 transmits the specific information to the specified client terminal 20 by the output unit (S25).

With this configuration, server device 10 can acquire more appropriate failure resolution information for client terminal 20.

In processing S13 of acquiring client terminal information 123 at a predetermined time interval, processor 11 may further acquire information on the time of acquisition of client terminal information 123. In this case, in secondary search S23, processor 11 may search the information of client terminal 20 specified by the information for search from among the information acquired on or after a predetermined day or at or after a predetermined time among client terminal information 123.

With this configuration, server device 10 can acquire new failure resolution information acquired on or after a predetermined day or at or after a predetermined time, and can acquire more appropriate failure resolution information for client terminal 20.

(Note)

Aspects of the present disclosure are illustrated below.

<First Aspect>

An information processing device used in a failure information provision system including a client system, the client system including a plurality of client terminals, the information processing device comprising: a processor; an input unit; and an output unit, in which the processor is configured to acquire first device information provided by a provider of each of the client terminals, the first device information including failure information indicating a failure related to each of the client terminals and failure resolution information for resolving the failure, generate a failure database containing the failure information and the failure resolution information that are associated with each other, acquire, from the client system, at a predetermined time interval, second device information of each of the client terminals managed in the client system, perform, in the failure database, primary search for the failure resolution information based on information for search for searching for the failure resolution information, the information for search being input via the input unit, perform, in the second device information, secondary search for information of the client terminal specified by the information for search, extract specific information of the client terminal that has been specified, from the failure resolution information by extracting information corresponding to a result of the secondary search from a result of the primary search, and transmit, by the output unit, the specific information to the client terminal that has been specified.

<Second Aspect>

The information processing device according to the first aspect, in which the processor is configured to further acquire information of a time when the second device information is acquired, in processing of acquiring the second device information at a predetermined time interval, and in the secondary search, search information of the client terminal specified by the information for search from among information acquired on or after a predetermined day or at or after a predetermined time among the second device information.

<Third Aspect>

An information processing method executed by an information processing device used in a failure information provision system including a client system, the client system including a plurality of client terminals, the information processing device including a processor, an input unit, and an output unit, the information processing method comprising, by the processor: acquiring first device information provided by a provider of each of the client terminals, the first device information including failure information indicating a failure related to each of the client terminals and failure resolution information for resolving the failure; generating a failure database containing the failure information and the failure resolution information that are associated with each other; acquiring, from the client system, at a predetermined time interval, second device information of each of the client terminals managed in the client system; performing, in the failure database, primary search for the failure resolution information based on information for search for searching for the failure resolution information, the information for search being input via the input unit; performing, in the second device information, secondary search for information of the client terminal specified by the information for search; extracting specific information of the client terminal that has been specified, from the failure resolution information by extracting information corresponding to a result of the secondary search from a result of the primary search; and transmitting, by the output unit, the specific information to the client terminal that has been specified.

<Fourth Aspect>

A non-transitory computer-readable storage medium storing a program for causing an information processing device to execute the information processing method according to the third aspect.

<Fifth Aspect>

A non-transitory computer-readable storage medium storing a program executed by a processor of an information processing device used in a failure information provision system including a client system, the client system including a plurality of client terminals, the information processing device including an input unit and an output unit, and the program causing the processor to execute: acquiring first device information provided by a provider of each of the client terminals, the first device information including failure information indicating a failure related to each of the client terminals and failure resolution information for resolving the failure; generating a failure database containing the failure information and the failure resolution information that are associated with each other; acquiring, from the client system, at a predetermined time interval, second device information of each of the client terminals managed in the client system; performing, in the failure database, primary search for the failure resolution information based on information for search input via the input unit, the information for search being for searching for the failure resolution information; performing, in the second device information, secondary search for information of the client terminal specified by the information for search, extracting specific information of the client terminal that has been specified, from the failure resolution information by extracting information corresponding to a result of the secondary search from a result of the primary search; and transmitting, by the output unit, the specific information to the client terminal that has been specified.

The present disclosure is applicable to an information processing device that communicates with a terminal.

What is claimed is:

1. An information processing device used in a failure information provision system including a client system,
the client system including a plurality of client terminals,
the information processing device comprising:
a processor;
an input unit; and
an output unit,
wherein
the processor is configured to
  acquire first device information provided by a provider of each of the client terminals, the first device information including failure information indicating a failure related to each of the client terminals and failure resolution information for resolving the failure,
  generate a failure database containing the failure information and the failure resolution information that are associated with each other,
  acquire, from the client system, at a predetermined time interval, second device information of each of the client terminals managed in the client system,
  perform, in the failure database, primary search for the failure resolution information based on information for search for searching for the failure resolution information, the information for search being input via the input unit,
  perform, in the second device information, secondary search for information of the client terminal specified by the information for search,
  extract specific information of the client terminal that has been specified, from the failure resolution information by extracting information corresponding to a result of the secondary search from a result of the primary search, and
  transmit, by the output unit, the specific information to the client terminal that has been specified.

2. The information processing device according to claim 1, wherein the processor is configured to
  further acquire information of a time when the second device information is acquired, in processing of acquiring the second device information at a predetermined time interval, and
  in the secondary search, search information of the client terminal specified by the information for search from among information acquired on or after a predetermined day or at or after a predetermined time among the second device information.

3. An information processing method executed by an information processing device used in a failure information provision system including a client system, the client system including a plurality of client terminals, the information processing device including a processor, an input unit, and an output unit, the information processing method comprising, by the processor:

acquiring first device information provided by a provider of each of the client terminals, the first device information including failure information indicating a failure related to each of the client terminals and failure resolution information for resolving the failure;

generating a failure database containing the failure information and the failure resolution information that are associated with each other;

acquiring, from the client system, at a predetermined time interval, second device information of each of the client terminals managed in the client system;

performing, in the failure database, primary search for the failure resolution information based on information for search for searching for the failure resolution information, the information for search being input via the input unit;

performing, in the second device information, secondary search for information of the client terminal specified by the information for search;

extracting specific information of the client terminal that has been specified, from the failure resolution information by extracting information corresponding to a result of the secondary search from a result of the primary search; and transmitting, by the output unit, the specific information to the client terminal that has been specified.

4. A non-transitory computer-readable storage medium storing a program for causing an information processing device to execute the information processing method according to claim 3.

* * * * *